(12) United States Patent
Walker et al.

(10) Patent No.: US 11,940,919 B2
(45) Date of Patent: Mar. 26, 2024

(54) RECALL PENDING CACHE LINE EVICTION

(71) Applicant: Micron Technology, Inc., Boise, ID (US)

(72) Inventors: Dean E. Walker, Allen, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/899,171

(22) Filed: Aug. 30, 2022

(65) Prior Publication Data

US 2024/0070078 A1 Feb. 29, 2024

(51) Int. Cl.
*G06F 12/0855* (2016.01)
*G06F 12/0891* (2016.01)

(52) U.S. Cl.
CPC ...... *G06F 12/0855* (2013.01); *G06F 12/0891* (2013.01)

(58) Field of Classification Search
CPC .......... G06F 12/0855; G06F 12/0891
See application file for complete search history.

(56) References Cited

U.S. PATENT DOCUMENTS

| | | | |
|---|---|---|---|
| 7,594,080 B2* | 9/2009 | Lovett | G06F 12/12 711/159 |
| 8,122,229 B2 | 2/2012 | Wallach et al. | |
| 8,156,307 B2 | 4/2012 | Wallach et al. | |
| 8,205,066 B2 | 6/2012 | Brewer et al. | |
| 8,423,745 B1 | 4/2013 | Brewer | |
| 8,561,037 B2 | 10/2013 | Brewer et al. | |
| 9,569,367 B1* | 2/2017 | Wigmore | G06F 12/0868 |
| 9,710,384 B2 | 7/2017 | Wallach et al. | |
| 10,990,391 B2 | 4/2021 | Brewer | |
| 10,990,392 B2 | 4/2021 | Brewer | |
| 2008/0270708 A1 | 10/2008 | Warner et al. | |
| 2012/0079177 A1 | 3/2012 | Brewer et al. | |
| 2013/0332711 A1 | 12/2013 | Leidel et al. | |
| 2015/0143350 A1 | 5/2015 | Brewer | |
| 2015/0206561 A1 | 7/2015 | Brewer et al. | |

(Continued)

FOREIGN PATENT DOCUMENTS

| | | |
|---|---|---|
| WO | 2010051167 | 5/2010 |
| WO | 2013184380 | 12/2013 |

(Continued)

*Primary Examiner* — Aracelis Ruiz
(74) *Attorney, Agent, or Firm* — Schwegman Lundberg & Woessner, P.A.

(57) ABSTRACT

System and techniques for recall pending cache line eviction are described herein. A queue that includes a deferred memory request is kept for a cache line. Metadata for the queue is stored in a cache line tag. When a recall is needed, the metadata is written from the tag to a first recall storage, referenced by a memory request ID. After the recall request is transmitted, the memory request ID is written to a second recall storage referenced by the message ID of the recall request. Upon receipt of a response to the recall request, the queue for the cache line can be restored by using the message ID in the response to lookup the memory request ID from the second recall storage, then using the memory request ID to lookup the metadata from the first recall storage, and then writing the metadata into the tag for the cache line.

24 Claims, 9 Drawing Sheets

(56) References Cited

U.S. PATENT DOCUMENTS

| | | |
|---|---|---|
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

\* cited by examiner

| | | |
|---|---|---|
| CACHE SET 0 (ADDRESS 00XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 1 (ADDRESS 01XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 2 (ADDRESS 10XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |
| CACHE SET 3 (ADDRESS 11XXXX) | CACHE LINE | WAY 0 TAG + DATA |
| | CACHE LINE | WAY 1 TAG + DATA |
| | CACHE LINE | WAY 2 TAG + DATA |
| | CACHE LINE | WAY 3 TAG + DATA |

FIG. 4

RECALL PENDING CACHE LINE EVICTION

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to recall pending cache line eviction.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 4 illustrates an example of an associative cache, according to an embodiment.

DETAILED DESCRIPTION

Figure 1:
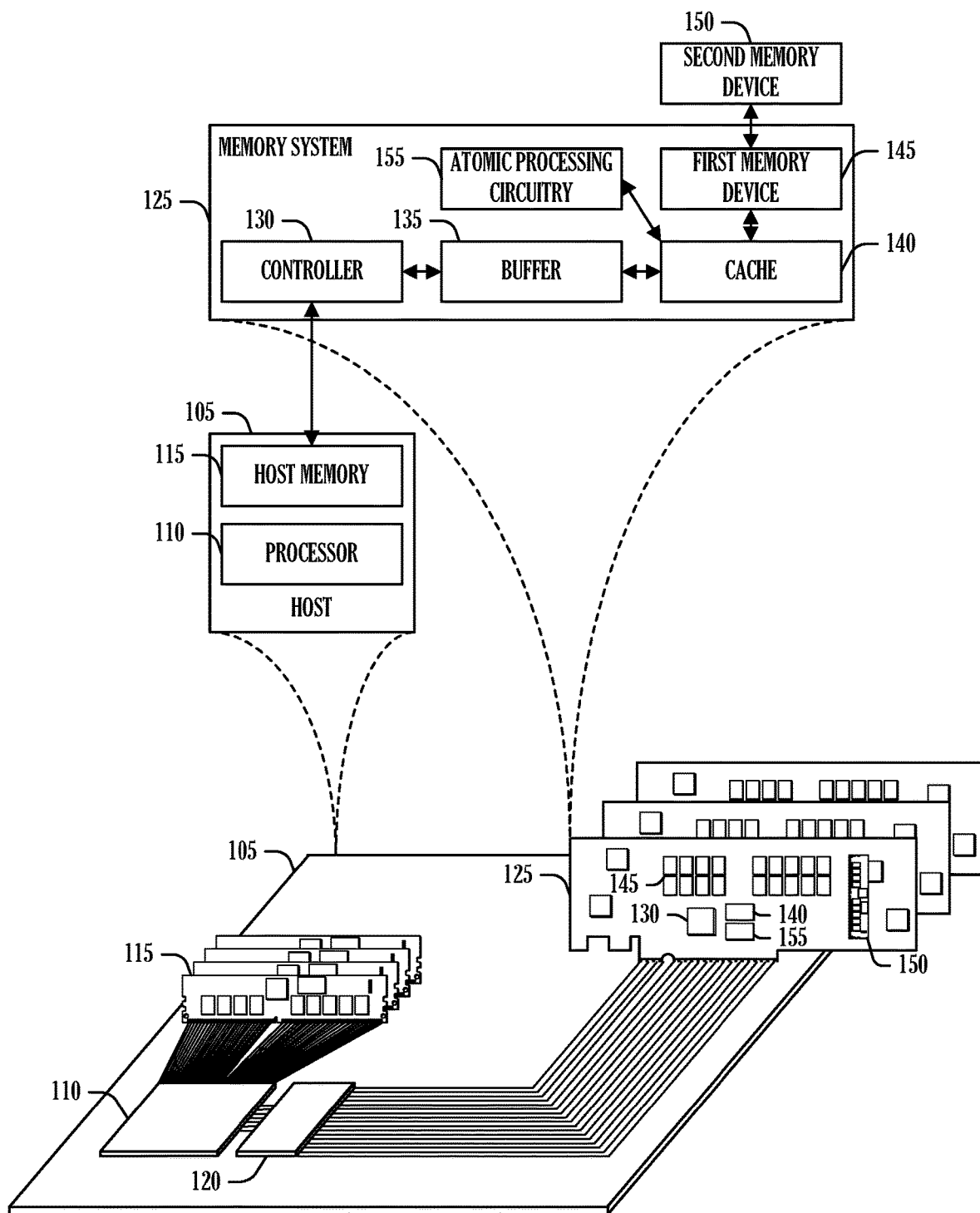
FIG. 1 illustrates an example of an environment including a system for recall pending cache line eviction, according to an embodiment.

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

CXL devices that include both memory and an accelerator can be termed "CXL type-2" devices. Although the accelerators of such devices can be used by themselves through the CXL interface, often these accelerators provide near-memory compute to reduce round-trip latency to a host processor. In accordance with current CXL standards, CXL memory requests (e.g., external requests) take priority over other requests, such as network-on-chip (NOC) or other internal requests. This priority requires CXL memory requests to make forward progress independent of any other device activity, such as activity by an accelerator. That is, a CXL memory request cannot block indefinitely waiting for a non-CXL memory request to complete. Separately managing memory controller workflow with this restriction when both CXL and non-CXL requests are being made can be a complex process.

To address the complexity between CXL (or other external) requests and accelerator (or other internal requests), separate processing queues are maintained for deferred requests. Requests that are not deferred proceed as soon as they arrive in the memory controller because there is no resource contention. Thus, in these cases, there is no opportunity, for example, for an internal request to block the progress of an external request. However, when resource contention is present, the request will be deferred until the contention is resolved. An elegant solution to managing the different processing priorities of external and internal requests includes queuing each in separate deferral queues, whereby priority of the external requests can be easily maintained by prioritizing extraction of requests from the external queue. Moreover, order of operations on a memory address can be maintained by judicious selection of requests from the external and internal queues all while preventing an internal request from blocking (e.g., preventing forward progress on) an external request.

It is generally important to maintain ordering of requests, such as read versus write requests, for data integrity or proper program execution in some CXL device accelerators. As noted herein, lists for cache ways and a cache set are used to hold deferred requests. By controlling into which lists, or queues, requests are placed, correct request process ordering can be ensured. For example, if a request for a specific memory way is in a set deferred request list (e.g., a general cache set queue or general deferred queue), then all future requests for that way can be pushed into the deferred request list. Similarly, if a request for a memory way is in a way deferred request list (e.g., queue specific to cache line or cache way), then all future requests for that way can be pushed into the deferred request list. A variety of other conditional queueing scenarios are provided herein. In an example, the conditions are ascertained from cache tag state for a hit in the cache.

By effectively queuing the pending requests in the tag-cache associated with the respective cache-line, or set-associative way in a cache set, enables a way to process the sequential input request queue and only retry pending requests once a set-associative way is available for eviction or processing of subsequent requests. This provides a performance advantage by limiting the number of non-productive cache access cycles. In an example, linked lists of pointers into a directory-based storage structure are used to store memory request details with only an index, or identifier, into the directory structure used in the various queues, reducing data requirements of the queues and internal bandwidth to move memory requests between queues. In an example, the linked list head and tail pointers of the queues can be stored in the tag-cache.

CXL coherency mechanisms provide control semantics for cache elements in CXL and host devices. An issue that can arise involves the time it can take to request control of a cache line from a host in a CXL device and when control is granted by the host to the CXL device. For example, a memory address managed by the CXL device can be reflected in a cache way of the CXL memory device as well as a cache way of a host processor. To modify the cache way by the CXL device, control of the cache way is requested from the host processor to enable the host processor to perform cache maintenance on the cache managed by the host processor. This procedure can be called a "recall" of the cache line, such that control of the cache line is recalled to the CXL device. The term "bias flip" also references this procedure as bias flips from the host to the CXL device upon a successful completion of the procedure. In an example, the host signifies the exchange of control for the cache line in CXL meta state of the CXL interface.

When an internal request specifies a memory line that is under host control (e.g., not device biased) then a recall or bias flip request must be sent to the host. The bias flip request state can be recorded in tag state—e.g., using a bias state pending flag or bit—to block on-device resources from accessing the line until the bias flip is completed by a CXL.mem REQ transaction. If, in a cache set (e.g., a set of cache lines or ways), all ways are being recalled from the host, then a way with a pending recall must be evicted to ensure forward progress. Therefore, if during the recall to return control of the line to the device, an external request arrives, the line can be evicted immediately. Accordingly, a way can be designated for eviction to enable a CXL.mem (e.g., external memory) request to make forward progress.

An ordering issue can arise if there are internal requests queued in the evicted way deferred queue. Because it is possible that the cache set queue includes requests for the evicted way—as an order preserving mechanism—the current contents of the deferred queue would be executed out-of-order if simply moved to the cache set queue. Moreover, because the status of the way—being in a bias flip or recall pending state—is held in the way tag, the eviction of the way will potentially eliminate this state information.

To address these issues, the defer queues and some or all of the tag data of the way being evicted are preserved in recall data structures. When the recall request is answered (e.g., by the host), the response to the recall request can be matched to an entry in the recall data structure to ascertain the tag data and the defer queue for the way. In this manner, the way state can be restored when processing of internal requests won't interfere with the external requests. These systems and techniques provide an elegant resolution to issues surrounding the necessity of enabling evictions of cache-lines in a recall pending state to ensure forward progress of CXL.mem transactions, as required by the CXL specification. Additional details and examples are provided below.

FIG. 1 illustrates an example of an environment including a system for recall pending cache line eviction, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning. The memory system 125 is illustrated with atomic processing circuitry 155 as an accelerator in order to perform near-memory operations. In general, the atomic memory operations (AMOs) performed by the atomic processing circuitry 155 include such small operations as incrementing a number at a memory address or multiply number in two memory addresses, etc. While AMOs are generally used for such operations, the manipulation of memory is not so restricted. For example, modern artificial neural network architectures generally involves the application of small additive or multiplicative operations or thresholding across vast swaths of artificial neurons. Because the computations are usually simple, but the data large, near memory execution of such operations is possible and beneficial given the illustrated architecture.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

The following operations are described as be implemented by the controller 130 for the sake of simplicity. However, the cache 140 can include circuitry to perform some or all of these operations. The controller 130 is configured to prioritize external (e.g., host requests, CXL memory requests, etc.) over internal requests (e.g., accelerator requests) via a queueing system that differentiates between the two types of requests. Specifically, the controller 130 is configured to maintain separate external request queues and internal request queues. Prioritization is given to the external request queue without complicated operation analysis or priority logic. FIG. 3, FIG. 4, FIG. 5, FIG. 6, and FIG. 7 illustrate various aspects of this multi queue system. In short, when a request is received, a determination is made as to whether the address in the request maps to a current way of a cache set. Because a cache set represents a range of address well beyond the number of ways, it is possible that the memory address of the request does not map to a current way. If the request maps to a current way, and the way is not busy, then the request is executed. If the way is busy, the request is placed into one of two a cache way queues for that way; either the cache way external queue if the request is an external request or the cache way internal queue if the request is an internal request. As the way becomes free (e.g., not busy because a previous request completes), a next request from the cache way queue is popped to execute on the way. Generally, the cache way external queue is emptied before a next request from the cache way internal queue is popped, thus ensuring that no internal request blocks forward progress of the external requests.

If there is no current way that matches the request, then the request is placed in the cache set external queue or the cache set internal queue depending on whether the request is an external request or an internal request. Usually, once a way is free (e.g., not busy and with empty cache way queues), the way can be evicted and a next request from the cache set queue—again, usually the cache set external queue first—popped. The memory line corresponding to the newly popped request is loaded into a way and the request can execute. In this manner, proper execution order and blocking given the priority of external requests over internal requests can be maintained.

Recall pending cache way eviction refers to the situation when a cache way is being evicted while awaiting the host processor 110 to grant the memory system 125, control over the cache way. Generally, a recall request is made by the memory system 125 when there are no outstanding external requests on the way. The recall request and subsequent response from the host processor 110 enables the entities to coherently modify the memory.

As described herein, the internal requests can be stored in the order that they arrived in a way queue. While the recall request is pending—for example, the time between the request being sent to the host processor 110 and receipt of a response from the host processor 110—the internal requests remain deferred. Generally, when the response to the recall request is received, the internal queue can be drained, and the requests processed in order. In cases, such as happens in CXL, a situation can arise in which a prioritized request, such as an external or CXL request, arrives while the recall request is pending. If there is no available way, a way will need to be evicted to handle this new request. A prioritization can be made in which ways without pending recall requests are evicted first. However, if this is not possible because all ways are busy or have pending recall requests, then the recall pending cache line eviction can be used. Here, the controller 130 (or the cache 140) is configured to maintain recall specific data structures to track pending recall way state. This state can then be restored at a later time when the recall request is granted by the host processor 110.

The controller 130 is configured to maintain a queue for a way. This queue includes a deferred memory request—to operate on a memory address currently associated with the way—that provoked a recall request for the way by the memory system 125. The way also has a tag with an indication that the way has a pending recall request and is in process of changing control between the memory system 125 and an external entity such as the host processor 110. In an example, the queue is a way internal queue (e.g., internal interface queue).

The controller 130 is configured to detect a condition indicating that the cache line is being evicted. As noted above, this condition can arise when a new external request arrives and there are no free or non-recall pending ways. In an example, the external interface queue is empty. This condition recognizes that the newly arriving external request will not displace an already pending external request at the way. Thus, in this example, the queue that is not empty must be the lower-priority queue to whatever request is in the condition that will provoke the eviction. In an example, detecting the condition includes receiving an external memory request for a memory address not currently associated with the cache line. This example illustrates that the new request will require eviction of the way rather than being able to use the present way.

The controller 130 is configured to copy queue metadata for the queue from the tag of the way to a storage location corresponding to the way. The storage location (e.g., portion of RAM, register, etc.) is identified (e.g., indexed) by the deferred memory request that prompted the recall request. Thus, the queue metadata can be retrieved from the storage location with the deferred memory request ID. Other keys could be used, such as a hash of the way address or the like, but the deferred request ID is convenient and available without additional hardware or processing.

Figure 7:
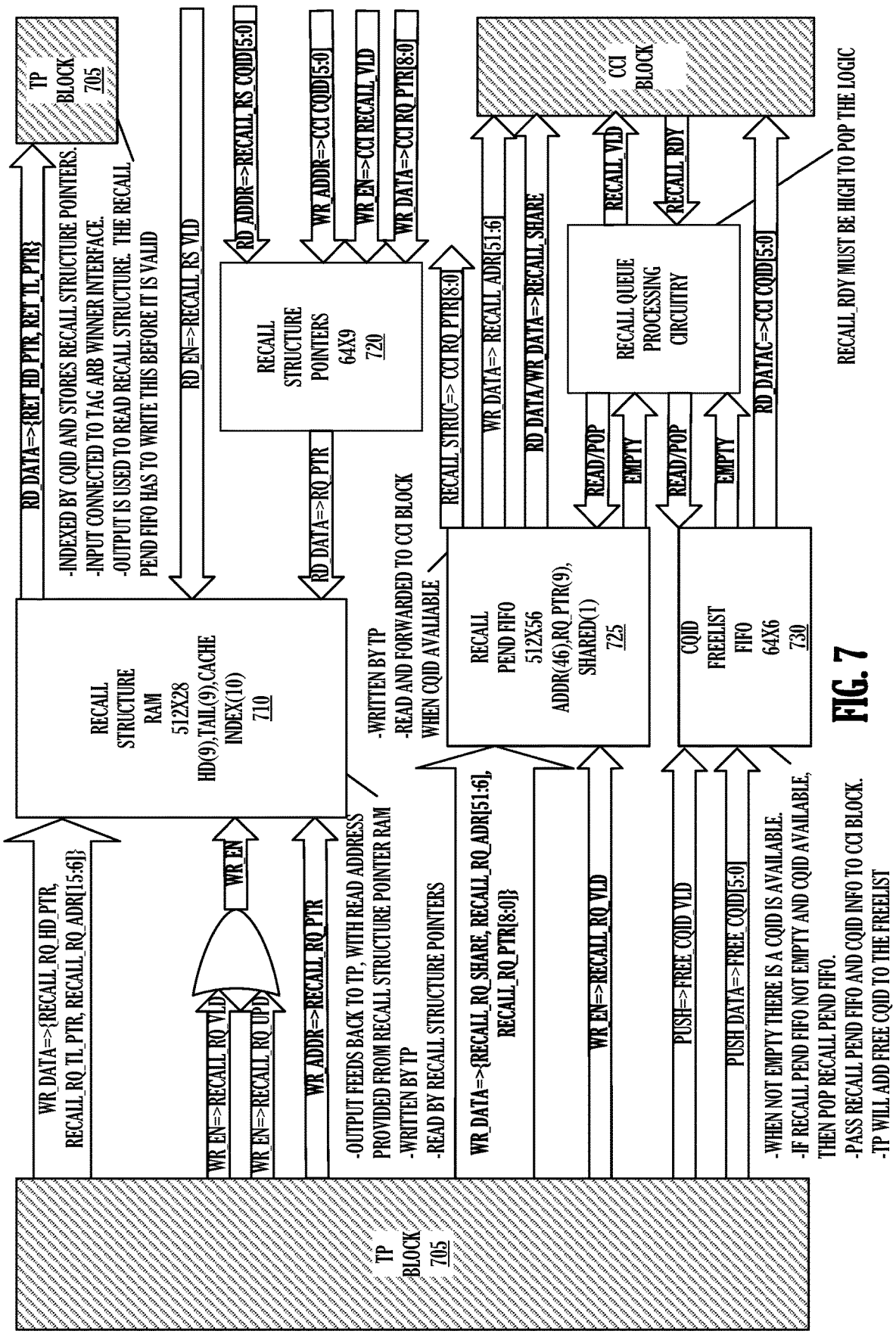
FIG. 7 illustrates an example of circuitry to implement queue management during a recall, according to an embodiment.

In an example, the queue metadata is a head or tail pointer to the queue. These examples provide a specific storage that is exclusive to the way hardware. This can be a range in a common RAM used for this purpose, or it can be a register bank dedicated to the way. In either case, there is storage set aside for each way to maintain the queue metadata. FIG. 7 illustrates an example of a hardware arrangement in which the recall RAM maintains this data.

The controller 130 is configured to receive an indication that the control has switched back between the memory system 125 and the external entity. Thus, in CXL, this would be a response to the recall request from the host processor 110. In an example, the indication an identifier (ID). In CXL, the ID can be the CQID. The CQID can be taken from a pool allocated to the memory system 125 and included with the recall request when it is sent to the host processor 110. The response will use the same CQID to enable the memory system 125 to connect the request with the response. Because the CQID is provided as the recall request is sent, the controller 130 can correlate the CQID to tag data of an evicted way. Thus, the controller 130 is configured to record the ID in a data structure entry along with a deferred memory request (e.g., an internal request that is in the way internal queue). In an example, where the memory requests use a directory to store details of the memory request, the entry includes only the deferred memory request ID, which can then be used to access the directory. In an example, the storage location that holds the queue metadata is different hardware that that used to store the data structure.

The controller 130 is configured to restore the queue for the way from the storage location using the ID (e.g., CQID) to find the entry that correlates the ID and the deferred memory request ID. The controller 130 can then use the deferred memory request ID from the entry to retrieve the metadata from the storage portion.

Figure 2:
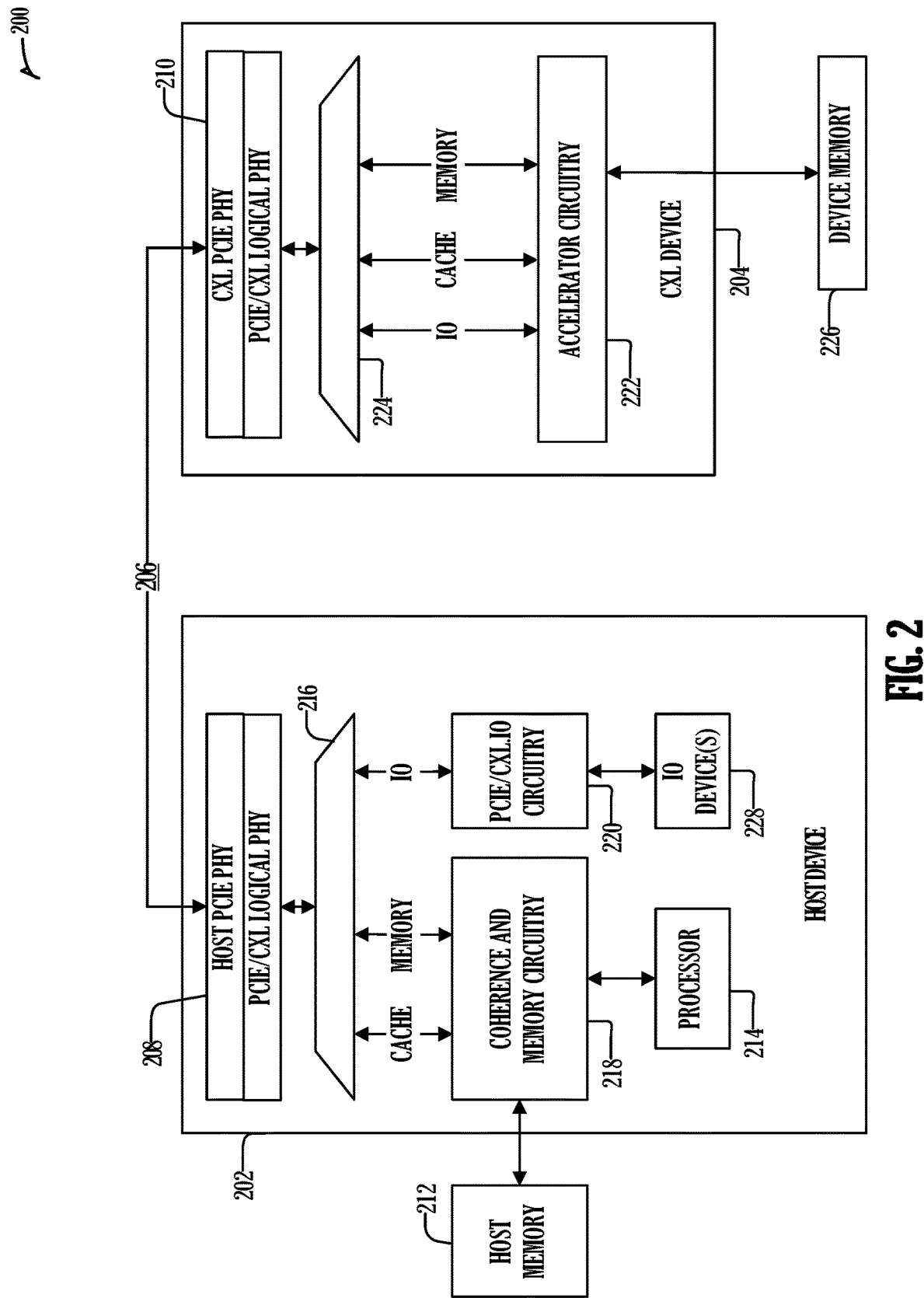
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

Figure 3:
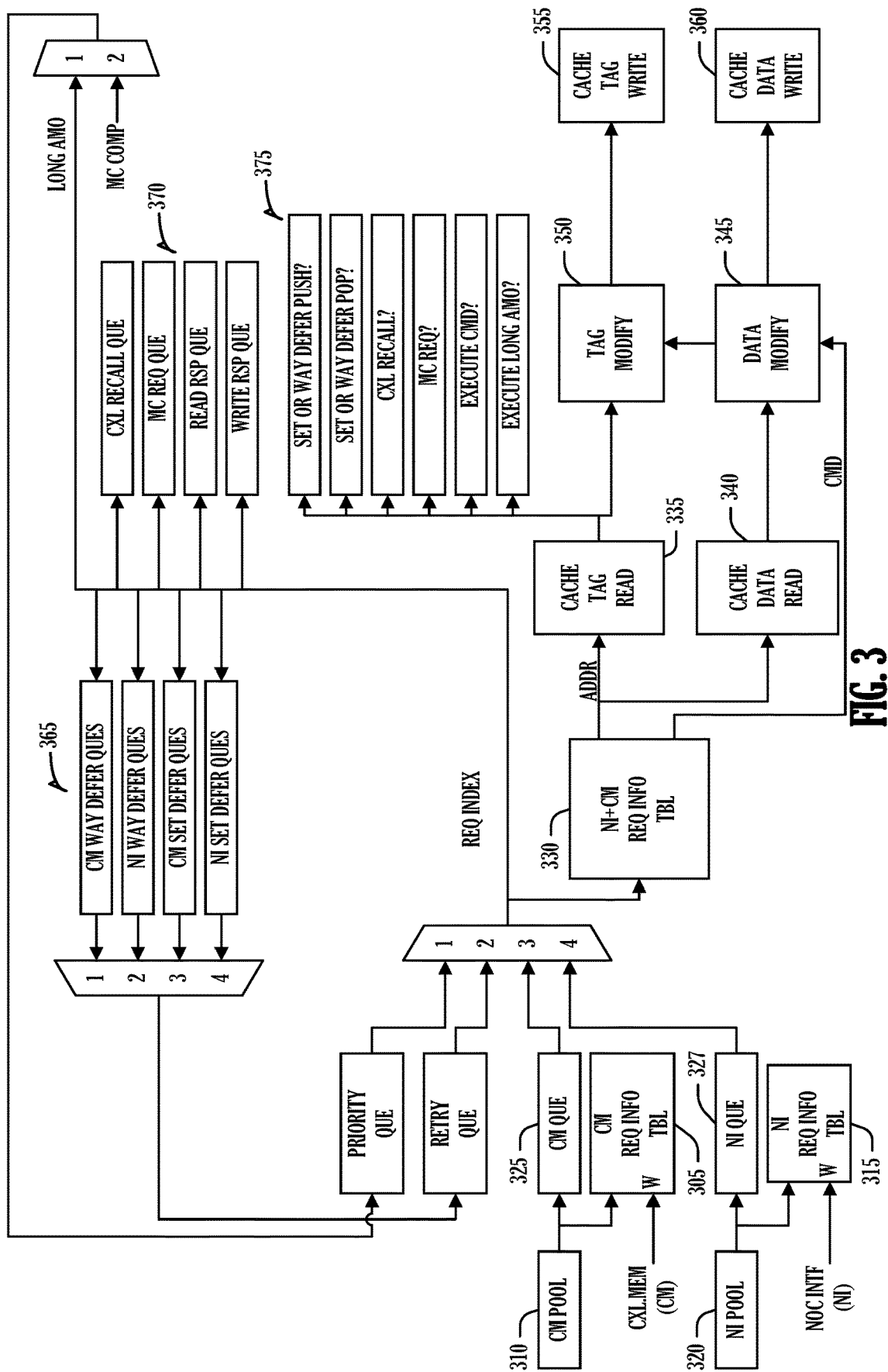
FIG. 3 illustrates example components of a memory device, according to an embodiment.

FIG. 3 illustrates example components of a memory device, according to an embodiment. The illustrated components are part of a memory controller, such as those described above (e.g., the memory controller 130 illustrated in FIG. 1) implementing a memory-side cache (MSC). The illustrated components include elements to address internal (e.g., from a near-memory accelerator) and external (e.g., received from a host via a CXL link) request differences used to maintain CXL protocol requirements, such as maintaining forward progress of CXL memory (CM) requests.

As illustrated, CM refers to CXL memory or other external requests and NI refers to requests coming from a NOC interface or other internal requests. Requests from CXL.mem are written to the CM Request Information Table 305. The entry in the CM Request Information Table 305 to which a request is written is obtained from the CM Request Information Table Pool 310. The CM Request Information Table Pool 310 maintains a list of indices to CM Request Information Table entries that are available (e.g., free, or unused). Requests from an accelerator within the device are written to the NI Request Information Table 315 using the NI Request Information Table Pool 320 for the available entry indices. The two pools—the CM Request Information Table Pool 310 and the NI Request Information Table Pool 320—are configured such that accelerator requests (e.g., internal requests) cannot consume all table entries. Thus, for example, if an additional NI request arrives and there is no free entry indicated in the NI Request Information Table Pool 320, the request fails.

CXL.mem requests from the CM queue 325 are selected at higher priority than NI requests in the NI queue 327 to ensure forward progress of the CM requests. In an example, as illustrated, when a request is selected from either the CM queue 325 or the NI queue 327, the request information is written into the NI+CM Request Information Table 325. Hereafter, each request is represented in the carious queues by an identifier (e.g., index) to an entry of the NI+CM Request Information Table 330. This arrangement can reduce the storage requirements and bandwidth in transferring the request information among the various queues at different processing points in the controller. When an aspect of the request is needed by a processing point, such as an address for a read, the identifier is used to reference the entry in the NI+CM Request Information Table 330 and retrieve the field of the request corresponding to the needed aspect. As with the CM Request Information Table 305 and the NI Request Information Table 315, a free list, or pool, of entries can be used to quickly determine which entries are available to store request information in the NI+CM Request Information Table 330.

When a request is selected, a cache tag 335 for a cache line (e.g., cache way) corresponding to an address in the request is checked to determine whether the requests will be deferred (e.g., processed later). Deferral of the request is generally required when there is no free way line entry in a cache set for the address in the request. If no deferral will occur, the cache data can be read 340 or modified 345 (e.g., for a write), and the way tag can be modified 350. Modifying the tag 350 or the cache data 345 can respectively be written to backing memory, such as in writing the tag data 355 and the cache way data 360.

When the request is deferred, the request the request entry identifier (e.g., from the NI+CM Request Information Table 330) is pushed to either the CM or NI defer queues 365. The way defer queues 365 are used when there is a way corresponding to the address in the request but the way is busy (e.g., waiting for another command to complete). The set defer queues 365 are used when there is no way that corresponds to the address. The request remains queued until a way is available (e.g., not busy). In an example, there are separate CM and NI defer queues 365 for each cache set within the cache.

The external control queues 370 manage external responses to the cache, such as responses to reads or writes to the backing memory, memory controller (MC) requests, or CXL recalls. A CXL recall is a request by the memory device to regain control of a cache way from the host. The recall is requested of the host and the host communicates the control of the cache way to the memory controller, for example, in CXL meta state. This procedure can be called a bias flip as the control bias for the cache way is flipped from the host to the controller or vice versa. This technique is used to enable cache coherency between any host cache and the memory device.

The command queues 375 track requests through a variety of processing points, such as whether to push or pop requests from defer queues 365, whether a CXL recall is initiated, memory controller requests, executing a command, or executing an atomic memory operation (AMO). The reference to a long AMO is an AMO that cannot complete within a single execution cycle (e.g., a clock cycle). An AMO is a near-memory operation completed by an accelerator of the memory controller.

The illustrated control and data paths are configured such that separate storage, queuing, and request prioritization enables forward progress on CM requests while executing in the presence of NI requests. Thus, CM requests will not be delayed by an NI request.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal, or external) of the request impacts operation of the memory controller, the tag data can include designation of whether the request is internal or external as well as, for example, whether the request is internal and deferred, or external and deferred.

Figure 5:
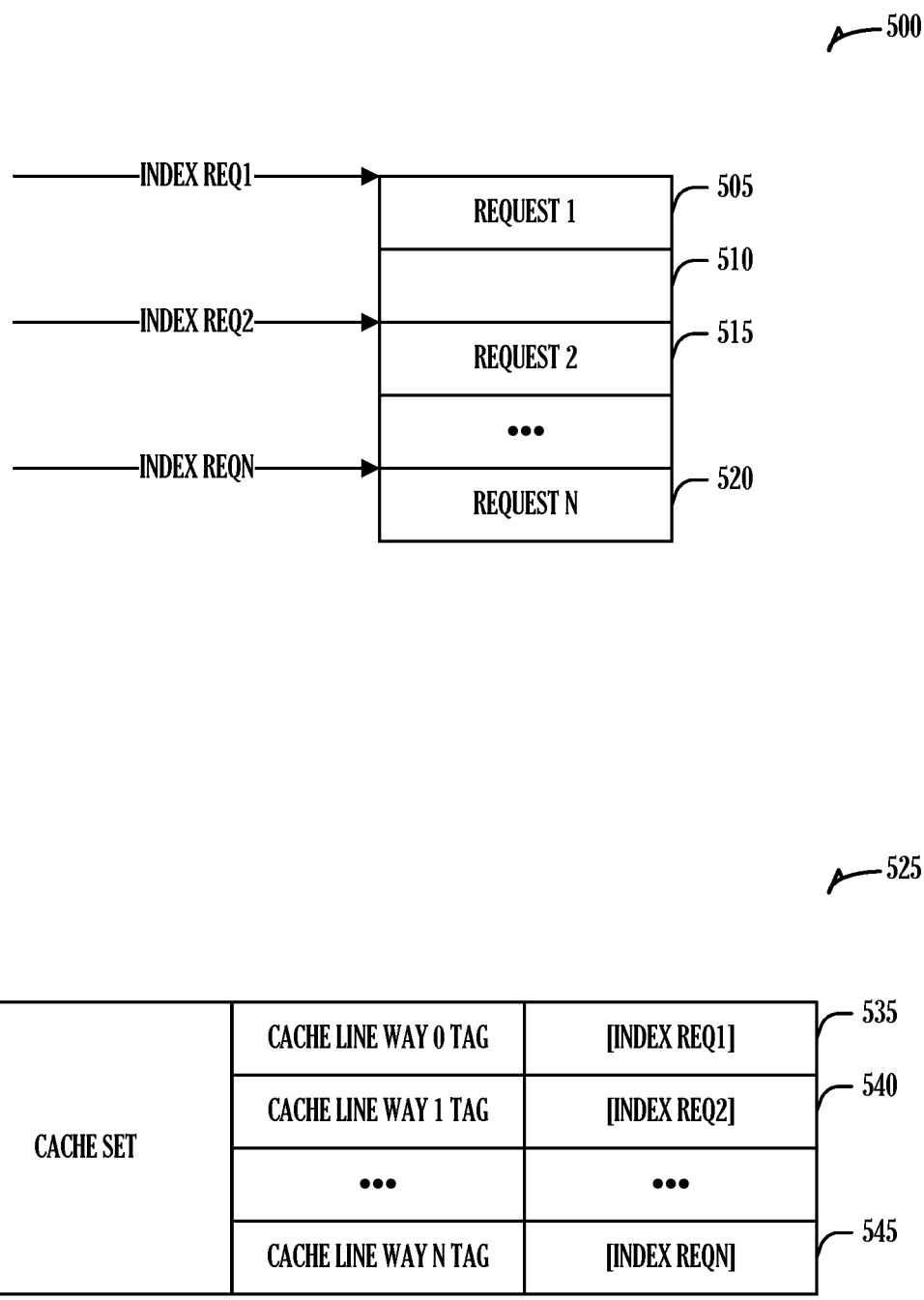
FIG. 5 illustrates an example of a memory including several cache way defer queues and cache tags pointing to the defer queues, according to an embodiment.

The following is an example of a data structure (e.g., C-style struct) to hold tag data that applies to an entire cache set (e.g., not specific to a single way in the cache set):
struct MscSet {
bool m_bRetryPend;
uint32_t m_evHashMask;
SimCount m_evRecallCnt;
SimMscReqList m_niDeferList;
SimMscReqList m_cmDeferList;
};
The following is an example of a data structure (e.g., C-style struct) to hold tag data for a given way in a cache set:
struct MscWay {
struct MscWayTag {
uint64_t m_addr;
std::bitset m_validMask;
std::bitset m_dirtyMask;
std::bitset m_mBusyMask;
bool m_bRetryPend;
bool m_bRecallPend;
uint16_t m_recallRid;
MetaState m_memMetaState;
MetaState m_curMetaState;

SimMscReqList m_niDeferList;
SimMscReqList m_cmDeferList;
}m_tag;
uint8_t[64] m_data;
};

FIG. 5 illustrates an example of a memory 500 including several cache way defer queues and cache tags 525 pointing to the defer queues, according to an embodiment. As illustrated, the memory 500 is used to implement several queues. The queues each occupy a contiguous range of the memory 500, with the specific boundaries of the queue defined by a head a tail pointer. In this example, the queue is implemented as a linked list or a double-linked list. The former enables traversal starting at the head, although enqueueing can be accomplished merely by updating the tail element with a new tail location and placing the new item at the new tail location. A double linked list enables traversal of the list from either the head or the tail.

The queues correspond to a cache way by storage of the head and tail pointers in the tag data. Thus, in the cache set 530, the way zero tag 535 maintains the head and tail pointer for the queue 505 (illustrated as holding request one). The empty entry 510 is part of the contiguous memory range corresponding to the queue 505. Thus, if a second request were enqueue, the tail pointer would be moved to the entry 510. Similarly, the way one tag 540 holds the head and tail pointer for the queue 515, and the way N tag 545 maintains the head and tail pointer for the queue 520.

An alternative configuration of the queue can leverage, if it exists, the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

Figure 6:
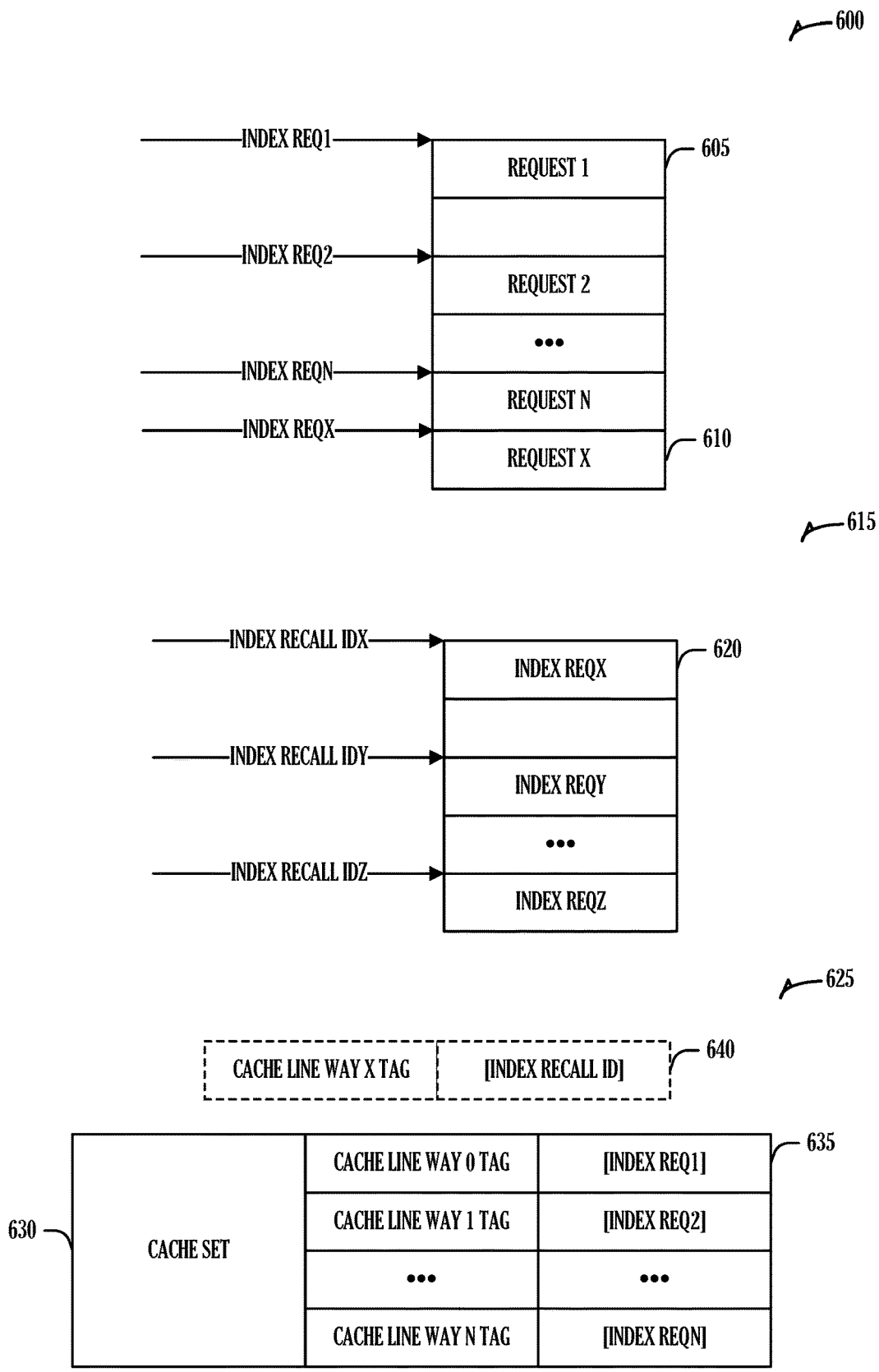
FIG. 6 illustrates an example of queue management for a way evicted during a recall, according to an embodiment.

FIG. 6 illustrates an example of queue management for a way evicted during a recall, according to an embodiment. The illustrated embodiment assumes a CXL type-2 device with a memory side cache. Here, the memory side cache uses a directory-based request structure and that maintains sets of queues of ordered requests (e.g., in the cache tag state) as described above (e.g., with respect to FIG. 3, FIG. 4, or FIG. 5). When a recall (e.g., bias flip) operation is started, the current queue head or tail pointers in a tag of a way can be copied into a recall structure 600, indexed by the request's directory pointer. Thus, the entry 605 holds the directory pointer for request one, and entry 610 for the X-th request.

When the CXL.cache transaction that will flip the bias state is assigned a CXL defined CQID, then a 2nd recall structure 615 is used to record the directory pointer of the original request, indexed by the assigned CQID, as illustrated in entry 620.

When any subsequent device resource requests access the same way, a new tail pointer value will update the tail pointer value of the first recall structure 600. To facilitate this, the original request's directory pointer is recorded in the tag state 640 of the cache 625 along with the bias flip pending status. For example, the way zero tag 635 of the cache set 630 includes the index pointer for the first request. In an example, this pointer is only valid when the recall pending status is asserted (e.g., set). This pointer from the cache-line tag will be used to index the 1st recall structure to update the tail pointer value. When an eviction is required, no further action is required to maintain the recall pending state because that information is already recorded in the recall structures 600 and 615.

When the host responds with a CXL.mem REQ transaction, to the original recall request, the host returns the original request's CQID. This CQID can then be used as an index into the second recall structure 615 to retrieve the directory pointer of the original request. Once the directory pointer of the original request is obtained, the directory pointer can be used as an index into the first recall structure 600 to retrieve the queue head and tail pointers. These queue head and tail pointers can then be written back into the way tag 635 to restore the original tag state prior to the eviction.

FIG. 7 illustrates an example of circuitry to implement queue management during a recall, according to an embodiment. The transaction processing circuitry, or TP block 705, the first recall structure RAM 710, the second recall structure pointer storage 720, the pending recall queue 725, and the CQID free list 730 structures interact in the manner illustrated. The following abbreviations are used in the illustration:

ADR: address
CMI: CXL memory interface (also referred to an external interface)
CQID: CXL defined transaction identifier (e.g., used in the response to the recall request)
Curr: current
EN: enable
HD: head
LL: linked list
NI: Network-on-Chip (NOC) interface (also referred to an internal interface)
NXT: next
PTR: pointer
RD: read
RDY: ready
R_LL: read linked list
RQ: request
STRUC: structure
VLD: valid
WR: write Also, in accordance with queue nomenclature, to pop is to remove the element at the head of a linked list and to push to put an element at the tail of the linked list.

The following are examples of set-associative tag (e.g., way tag) bits that can be used in this context:

| Field Name | Field bits | Field LSB | Description |
|---|---|---|---|
| re-call_pend | 1 | 56 | Recall pending for this cache way - set when a recall is sent to the CCI block; cleared by TP when CMI MemRdFwd is processed. Note: unlike the mbusy and retry_pend bits, a cache line in the recall_pend state must be |

-continued

| Field Name | Field bits | LSB | Description |
|---|---|---|---|
| re-call_ptr | 9 | 47 | able to be evicted to make a way available for a subsequent CMI request. Pointer into Recall Structure for linked list maintenance when a recall is pending, valid when recall_pend == 1. If a line in the recall pending state is evicted, the associated NI linked list will be restored from the Recall Structure when the MemRdFwd is returned. |
| nlempty | 1 | 19 | NI list empty - implies NI linked list head and tail pointers are valid (when 0) |
| nhdptr | 9 | 10 | NI head pointer - pointer to head of way's NI linked list, valid if nlempty == 0 |
| ntlptr | 9 | 1 | NI tail pointer - pointer to the tail of way's NI linked list, valid if nlempty == 0 |

Figure 8:
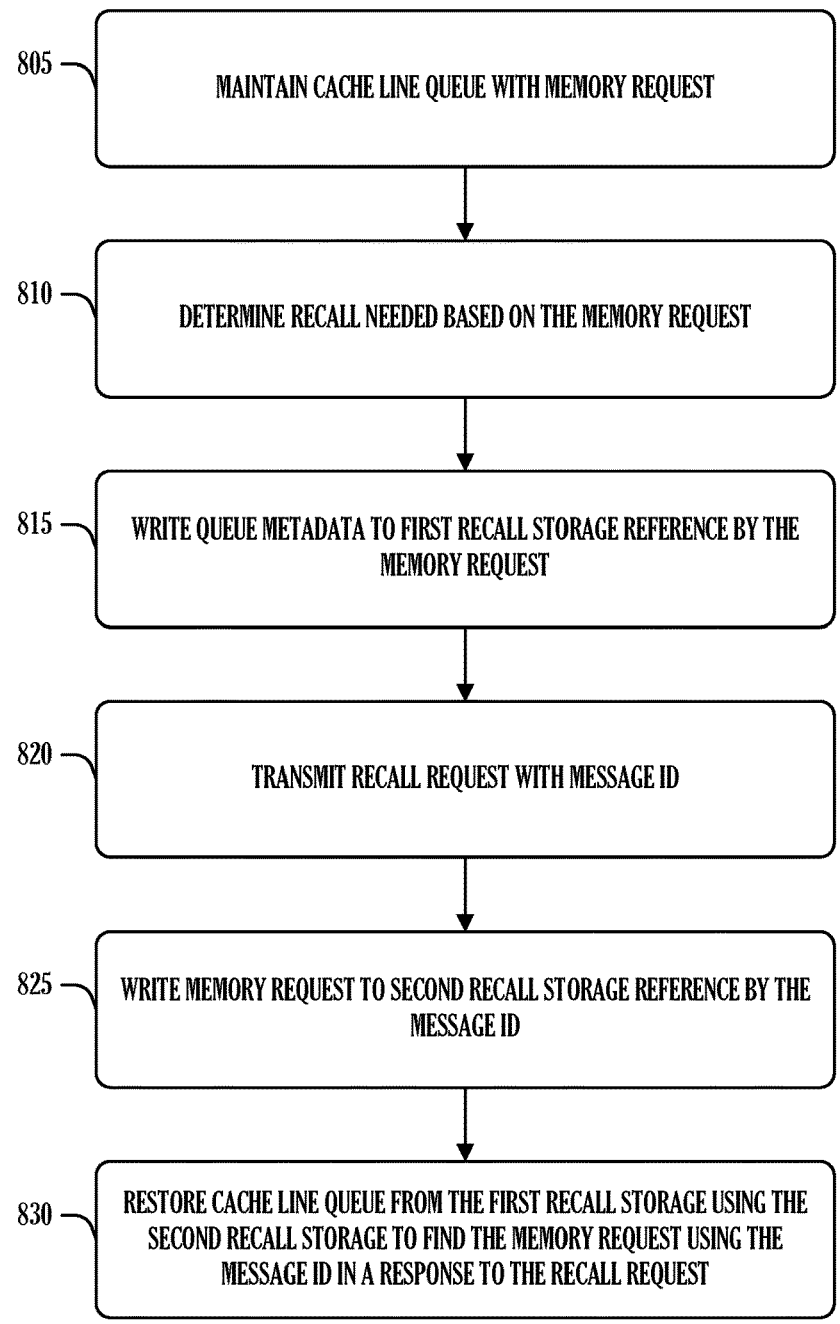
FIG. 8 illustrates a flow diagram of an example of a method for recall pending cache line eviction, according to an embodiment.

FIG. 8 illustrates a flow diagram of an example of a method 800 for recall pending cache line eviction, according to an embodiment. The operations of the method 800 are performed by computational hardware, such as that described above or below (e.g., processing circuitry).

At operation 805, a queue is maintained for a cache line. Here, the queue includes a deferred memory request to operate on a memory address currently associated with the cache line. Also, metadata for the queue is stored in a tag of the cache line. In an example, the queue is an internal interface queue; the entries in the queue having come from an internal interface of the memory device. In an example, the queue is one of multiple queues including a second queue that is an external interface queue. Here, the entries in the external interface queue came from an external interface to the memory device. In an example, the external interface conforms to a Compute Express Link (CXL) standard.

At operation 810, a determination that a recall is needed to process the deferred memory request is made. A recall is a change of control of the cache line to the memory device.

At operation 815, in response to the determination that the recall is needed (operation 810), the metadata of the queue is written from the tag to a first recall storage corresponding to the cache line. Here, the first recall storage is referenced by a memory request ID corresponding to the deferred memory request. In an example, the queue metadata is a head or tail pointer to the queue. In an example, writing the metadata of the queue includes writing the memory request ID into the tag of the cache line At operation 820, a recall request including a message ID is transmitted. In an example, the message ID is a CXL CQID. In an example, transmitting the recall request includes verifying that the external interface queue is empty. In an example, transmitting the recall request includes writing a recall pending indication to the tag of the cache line. In an example, the memory request ID in the tag is valid only if the pending recall indication is set.

At operation 825, in response to the transmission of the recall request (operation 820), the memory request ID is written to a second recall storage referenced by the message ID. In an example, the first recall storage is a first hardware dedicated to the cache line and the second recall storage is a second hardware dedicated to the cache line of the memory device.

At operation 830, the queue for the cache line is restored based on a response to the recall request and an eviction of the cache line. The queue restoration occurs from the first recall storage using the memory request ID retrieved from the second recall storage using the message ID included in the response to the recall request. In an example, restoring the queue includes copying the head or the tail pointer into a tag for the cache line.

In an example, the operations of the method 800 can include receiving a memory request prior to restoring the queue for the cache line. Then, the memory request can be enqueued in the queue. Next, the metadata of the queue is updated in the first recall storage.

Figure 9:
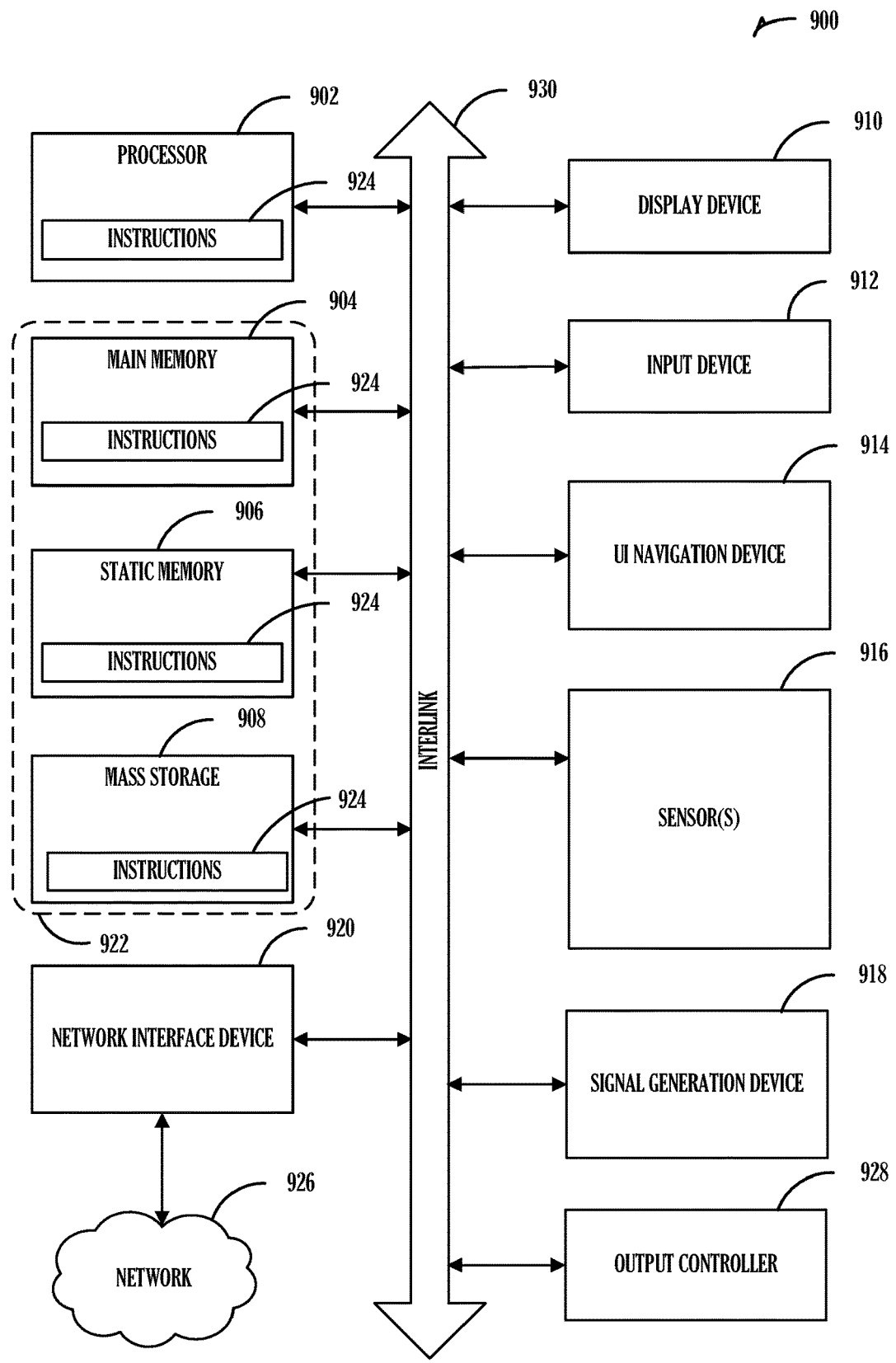
FIG. 9 illustrates an example of a machine with which one or more embodiments can be implemented.

FIG. 9 illustrates a block diagram of an example machine 900 with which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 can be representative of the instructions 924, such as instructions 924 themselves or a format from which the instructions 924 can be derived. This format from which the instructions 924 can be derived can include source code, encoded instructions (e.g., in compressed or encrypted form), packaged instructions (e.g., split into multiple packages), or the like. The information representative of the instructions 924 in the machine readable medium 922 can be processed by processing circuitry into the instructions to implement any of the operations discussed herein. For example, deriving the instructions 924 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 can include assembly, compilation, or interpretation of the information (e.g., by the processing circuitry) to create the instructions 924 from some intermediate or preprocessed format provided by the machine readable medium 922. The information, when provided in multiple parts, can be combined, unpacked, and modified to create the instructions 924. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is an apparatus for recall pending cache line eviction, the apparatus comprising: a cache including a cache line; an interface to an external entity; and processing circuitry configured to maintain a queue for the cache line, the queue including a deferred memory request to operate on a memory address currently associated with the cache line, metadata for the queue being stored in a tag of the cache line; determine that a recall is needed to process the deferred memory request, the recall being a change of control of the cache line from the external entity; write, in response to the determination that the recall is needed, the metadata of the queue from the tag to a first recall storage corresponding to the cache line, the first recall storage referenced by a memory request ID corresponding to the deferred memory request; transmit, via the interface, a recall request including a message ID to the external entity; write, in response to transmission of the recall request, the memory request ID to a second recall storage referenced by the message ID; and restore the queue for the cache line, based on a response to the recall request and an eviction of the cache line, from the first recall storage, the response including the message ID, the message ID used to retrieve the memory request ID from the second recall storage, and the memory request ID used to reference the first recall storage.

In Example 2, the subject matter of Example 1, wherein the processing circuitry is configured to: receive a memory request prior to restoring the queue for the cache line; enqueue the memory request in the queue; and update the metadata of the queue in the first recall storage.

In Example 3, the subject matter of any of Examples 1-2, wherein the metadata of the queue is a head or tail pointer to the queue.

In Example 4, the subject matter of Example 3, wherein, to restore the queue, the processing circuitry is configured to copy the head or the tail pointer into a tag for the cache line.

In Example 5, the subject matter of any of Examples 1-4, comprising an internal interface, wherein the queue is an internal interface queue, and entries in the queue having come from the internal interface.

In Example 6, the subject matter of Example 5, wherein the queue is one of multiple queues including a second queue that is an external interface queue, the entries in the external interface queue having come from the interface.

In Example 7, the subject matter of Example 6, wherein the interface conforms to a Compute Express Link (CXL) standard.

In Example 8, the subject matter of Example 7, wherein, to transmit the recall request, the processing circuitry is configured to verify that the external interface queue is empty.

In Example 9, the subject matter of any of Examples 1-8, wherein, to write the metadata of the queue, the processing circuitry is configured to write the memory request ID into the tag of the cache line.

In Example 10, the subject matter of Example 9, wherein, to transmit the recall request, the processing circuitry is configured to write a recall pending indication to the tag of the cache line.

In Example 11, the subject matter of Example 10, wherein the memory request ID in the tag is valid only if the recall pending indication is set.

In Example 12, the subject matter of any of Examples 1-11, wherein the first recall storage is a first hardware dedicated to the cache line and the second recall storage is a second hardware dedicated to the cache line.

Example 13 is a method for recall pending cache line eviction, the method comprising: maintaining a queue for a cache line in a memory device, the queue including a deferred memory request to operate on a memory address currently associated with the cache line, metadata for the queue being stored in a tag of the cache line; determining that a recall is needed to process the deferred memory request, the recall being a change of control of the cache line to the memory device; writing, in response to the determination that the recall is needed, the metadata of the queue from the tag to a first recall storage corresponding to the cache line, the first recall storage referenced by a memory request ID corresponding to the deferred memory request; transmitting a recall request including a message ID; writing, in response to transmission of the recall request, the memory request ID to a second recall storage referenced by the message ID; and restoring the queue for the cache line, based on a response to the recall request and an eviction of the cache line, from the first recall storage, the response including the message ID, the message ID used to retrieve the memory request ID from the second recall storage, and the memory request ID used to reference the first recall storage.

In Example 14, the subject matter of Example 13, comprising: receiving a memory request prior to restoring the queue for the cache line; enqueueing the memory request in the queue; and updating the metadata of the queue in the first recall storage.

In Example 15, the subject matter of any of Examples 13-14, wherein the metadata of the queue is a head or tail pointer to the queue.

In Example 16, the subject matter of Example 15, wherein restoring the queue includes copying the head or the tail pointer into a tag for the cache line.

In Example 17, the subject matter of any of Examples 13-16, wherein the queue is an internal interface queue, and entries in the queue having come from an internal interface of the memory device.

In Example 18, the subject matter of Example 17, wherein the queue is one of multiple queues including a second queue that is an external interface queue, the entries in the external interface queue having come from an external interface to the memory device.

In Example 19, the subject matter of Example 18, wherein the external interface conforms to a Compute Express Link (CXL) standard.

In Example 20, the subject matter of Example 19, wherein transmitting the recall request includes verifying that the external interface queue is empty.

In Example 21, the subject matter of any of Examples 13-20, wherein writing the metadata of the queue includes writing the memory request ID into the tag of the cache line.

In Example 22, the subject matter of Example 21, wherein transmitting the recall request includes writing a recall pending indication to the tag of the cache line.

In Example 23, the subject matter of Example 22, wherein the memory request ID in the tag is valid only if the recall pending indication is set.

In Example 24, the subject matter of any of Examples 13-23, wherein the first recall storage is a first hardware dedicated to the cache line and the second recall storage is a second hardware dedicated to the cache line.

Example 25 is a machine readable medium including instructions for recall pending cache line eviction, the instructions, when executed by processing circuitry, cause the processing circuitry to perform operations comprising: maintaining a queue for a cache line in a memory device, the queue including a deferred memory request to operate on a memory address currently associated with the cache line, metadata for the queue being stored in a tag of the cache line; determining that a recall is needed to process the deferred memory request, the recall being a change of control of the cache line to the memory device; writing, in response to the determination that the recall is needed, the metadata of the queue from the tag to a first recall storage corresponding to the cache line, the first recall storage referenced by a memory request ID corresponding to the deferred memory request; transmitting a recall request including a message ID; writing, in response to transmission of the recall request, the memory request ID to a second recall storage referenced by the message ID; and restoring the queue for the cache line, based on a response to the recall request and an eviction of the cache line, from the first recall storage, the response including the message ID, the message ID used to retrieve the memory request ID from the second recall storage, and the memory request ID used to reference the first recall storage.

In Example 26, the subject matter of Example 25, wherein the operations comprise: receiving a memory request prior to restoring the queue for the cache line; enqueueing the memory request in the queue; and updating the metadata of the queue in the first recall storage.

In Example 27, the subject matter of any of Examples 25-26, wherein the metadata of the queue is a head or tail pointer to the queue.

In Example 28, the subject matter of Example 27, wherein restoring the queue includes copying the head or the tail pointer into a tag for the cache line.

In Example 29, the subject matter of any of Examples 25-28, wherein the queue is an internal interface queue, and entries in the queue having come from an internal interface of the memory device.

In Example 30, the subject matter of Example 29, wherein the queue is one of multiple queues including a second queue that is an external interface queue, the entries in the external interface queue having come from an external interface to the memory device.

In Example 31, the subject matter of Example 30, wherein the external interface conforms to a Compute Express Link (CXL) standard.

In Example 32, the subject matter of Example 31, wherein transmitting the recall request includes verifying that the external interface queue is empty.

In Example 33, the subject matter of any of Examples 25-32, wherein writing the metadata of the queue includes writing the memory request ID into the tag of the cache line.

In Example 34, the subject matter of Example 33, wherein transmitting the recall request includes writing a recall pending indication to the tag of the cache line.

In Example 35, the subject matter of Example 34, wherein the memory request ID in the tag is valid only if the recall pending indication is set.

In Example 36, the subject matter of any of Examples 25-35, wherein the first recall storage is a first hardware dedicated to the cache line and the second recall storage is a second hardware dedicated to the cache line.

Example 37 is a system for recall pending cache line eviction, the system comprising: means for maintaining a queue for a cache line in a memory device, the queue including a deferred memory request to operate on a memory address currently associated with the cache line, metadata for the queue being stored in a tag of the cache line; means for determining that a recall is needed to process the deferred memory request, the recall being a change of control of the cache line to the memory device; means for writing, in response to the determination that the recall is needed, the metadata of the queue from the tag to a first recall storage corresponding to the cache line, the first recall storage referenced by a memory request ID corresponding to the deferred memory request; means for transmitting a recall request including a message ID; means for writing, in response to transmission of the recall request, the memory request ID to a second recall storage referenced by the message ID; and means for restoring the queue for the cache line, based on a response to the recall request and an eviction of the cache line, from the first recall storage, the response including the message ID, the message ID used to retrieve the memory request ID from the second recall storage, and the memory request ID used to reference the first recall storage.

In Example 38, the subject matter of Example 37, comprising: means for receiving a memory request prior to restoring the queue for the cache line; means for enqueueing the memory request in the queue; and means for updating the metadata of the queue in the first recall storage.

In Example 39, the subject matter of any of Examples 37-38, wherein the metadata of the queue is a head or tail pointer to the queue.

In Example 40, the subject matter of Example 39, wherein the means for restoring the queue include means for copying the head or the tail pointer into a tag for the cache line.

In Example 41, the subject matter of any of Examples 37-40, wherein the queue is an internal interface queue, and entries in the queue having come from an internal interface of the memory device.

In Example 42, the subject matter of Example 41, wherein the queue is one of multiple queues including a second queue that is an external interface queue, the entries in the external interface queue having come from an external interface to the memory device.

In Example 43, the subject matter of Example 42, wherein the external interface conforms to a Compute Express Link (CXL) standard.

In Example 44, the subject matter of Example 43, wherein the means for transmitting the recall request include means for verifying that the external interface queue is empty.

In Example 45, the subject matter of any of Examples 37-44, wherein the means for writing the metadata of the queue include means for writing the memory request ID into the tag of the cache line.

In Example 46, the subject matter of Example 45, wherein the means for transmitting the recall request include means for writing a recall pending indication to the tag of the cache line.

In Example 47, the subject matter of Example 46, wherein the memory request ID in the tag is valid only if the recall pending indication is set.

In Example 48, the subject matter of any of Examples 37-47, wherein the first recall storage is a first hardware dedicated to the cache line and the second recall storage is a second hardware dedicated to the cache line.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:
   a cache including a cache line;
   an interface to an external entity; and
   processing circuitry configured to:
      maintain a queue for the cache line, the queue including a deferred memory request to operate on a memory address currently associated with the cache line, metadata for the queue being stored in a tag of the cache line;
      determine that a recall is needed to process the deferred memory request, the recall being a change of control of the cache line from the external entity;
      write, in response to the determination that the recall is needed, the metadata of the queue from the tag to a first recall storage corresponding to the cache line, the first recall storage referenced by a memory request ID corresponding to the deferred memory request;
      transmit, via the interface, a recall request including a message ID to the external entity;
      write, in response to transmission of the recall request, the memory request ID to a second recall storage referenced by the message ID; and
      restore the queue for the cache line, based on a response to the recall request and an eviction of the cache line, from the first recall storage, the response including the message ID, the message ID used to retrieve the memory request ID from the second recall storage, and the memory request ID used to reference the first recall storage.

2. The apparatus of claim 1, wherein the processing circuitry is configured to:
   receive a memory request prior to restoring the queue for the cache line;
   enqueue the memory request in the queue; and
   update the metadata of the queue in the first recall storage.

3. The apparatus of claim 1, wherein the metadata of the queue is a head or tail pointer to the queue.

4. The apparatus of claim 3, wherein, to restore the queue, the processing circuitry is configured to copy the head or the tail pointer into the tag for the cache line.

5. The apparatus of claim 1, wherein, to write the metadata of the queue, the processing circuitry is configured to write the memory request ID into the tag of the cache line.

6. The apparatus of claim 5, wherein, to transmit the recall request, the processing circuitry is configured to write a recall pending indication to the tag of the cache line.

7. The apparatus of claim 6, wherein the memory request ID in the tag is valid only if the recall pending indication is set.

8. The apparatus of claim 1, wherein the first recall storage is a first hardware dedicated to the cache line and the second recall storage is a second hardware dedicated to the cache line.

9. A method comprising:
   maintaining a queue for a cache line in a memory device, the queue including a deferred memory request to operate on a memory address currently associated with the cache line, metadata for the queue being stored in a tag of the cache line;
   determining that a recall is needed to process the deferred memory request, the recall being a change of control of the cache line to the memory device;
   writing, in response to the determination that the recall is needed, the metadata of the queue from the tag to a first recall storage corresponding to the cache line, the first recall storage referenced by a memory request ID corresponding to the deferred memory request;
   transmitting a recall request including a message ID;
   writing, in response to transmission of the recall request, the memory request ID to a second recall storage referenced by the message ID; and
   restoring the queue for the cache line, based on a response to the recall request and an eviction of the cache line, from the first recall storage, the response including the message ID, the message ID used to retrieve the memory request ID from the second recall storage, and the memory request ID used to reference the first recall storage.

10. The method of claim 9, comprising:
receiving a memory request prior to restoring the queue for the cache line;
enqueueing the memory request in the queue; and
updating the metadata of the queue in the first recall storage.

11. The method of claim 9, wherein the metadata of the queue is a head or tail pointer to the queue.

12. The method of claim 11, wherein restoring the queue includes copying the head or the tail pointer into the tag for the cache line.

13. The method of claim 9, wherein writing the metadata of the queue includes writing the memory request ID into the tag of the cache line.

14. The method of claim 13, wherein transmitting the recall request includes writing a recall pending indication to the tag of the cache line.

15. The method of claim 14, wherein the memory request ID in the tag is valid only if the recall pending indication is set.

16. The method of claim 9, wherein the first recall storage is a first hardware dedicated to the cache line and the second recall storage is a second hardware dedicated to the cache line.

17. A non-transitory machine readable medium including instructions that, when executed by processing circuitry, cause the processing circuitry to perform operations comprising:
maintaining a queue for a cache line in a memory device, the queue including a deferred memory request to operate on a memory address currently associated with the cache line, metadata for the queue being stored in a tag of the cache line;
determining that a recall is needed to process the deferred memory request, the recall being a change of control of the cache line to the memory device;
writing, in response to the determination that the recall is needed, the metadata of the queue from the tag to a first recall storage corresponding to the cache line, the first recall storage referenced by a memory request ID corresponding to the deferred memory request;
transmitting a recall request including a message ID;
writing, in response to transmission of the recall request, the memory request ID to a second recall storage referenced by the message ID; and
restoring the queue for the cache line, based on a response to the recall request and an eviction of the cache line, from the first recall storage, the response including the message ID, the message ID used to retrieve the memory request ID from the second recall storage, and the memory request ID used to reference the first recall storage.

18. The non-transitory machine readable medium of claim 17, wherein the operations comprise:
receiving a memory request prior to restoring the queue for the cache line;
enqueueing the memory request in the queue; and
updating the metadata of the queue in the first recall storage.

19. The non-transitory machine readable medium of claim 17, wherein the metadata of the queue is a head or tail pointer to the queue.

20. The non-transitory machine readable medium of claim 19, wherein restoring the queue includes copying the head or the tail pointer into the tag for the cache line.

21. The non-transitory machine readable medium of claim 17, wherein writing the metadata of the queue includes writing the memory request ID into the tag of the cache line.

22. The non-transitory machine readable medium of claim 21, wherein transmitting the recall request includes writing a recall pending indication to the tag of the cache line.

23. The non-transitory machine readable medium of claim 22, wherein the memory request ID in the tag is valid only if the recall pending indication is set.

24. The non-transitory machine readable medium of claim 17, wherein the first recall storage is a first hardware dedicated to the cache line and the second recall storage is a second hardware dedicated to the cache line.

* * * * *